Dec. 23, 1930.  C. E. WILSON  1,786,183
GAUGE GLASS ILLUMINATOR
Filed March 1, 1929
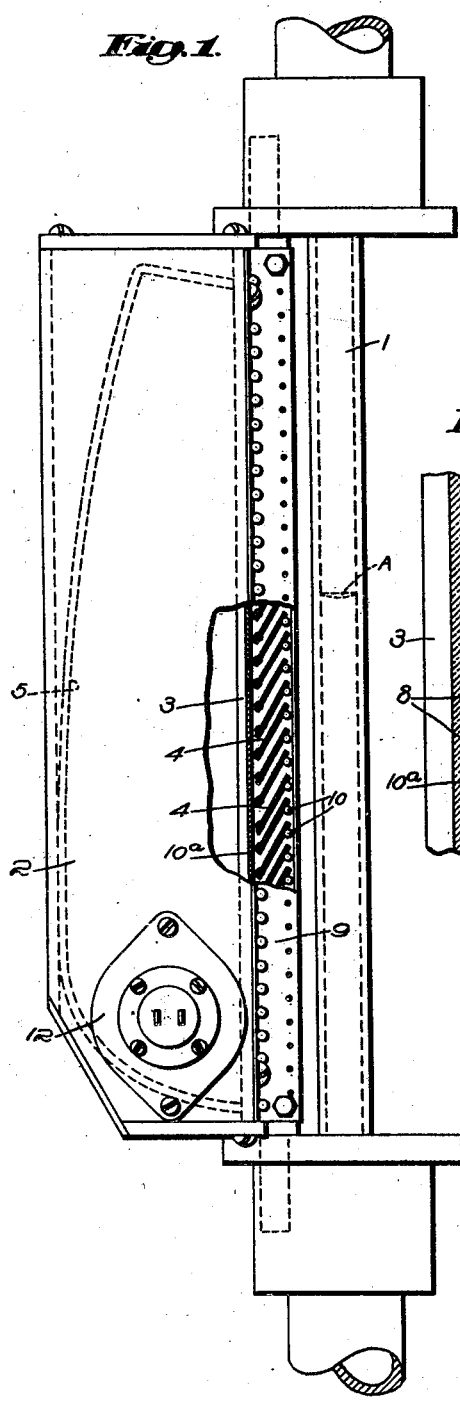
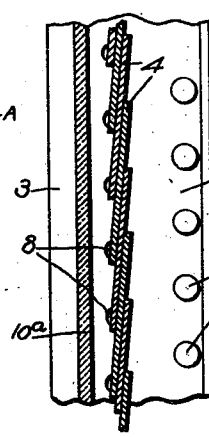
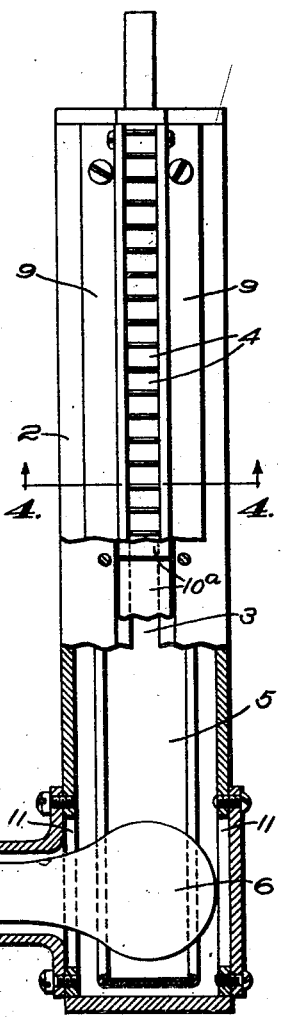
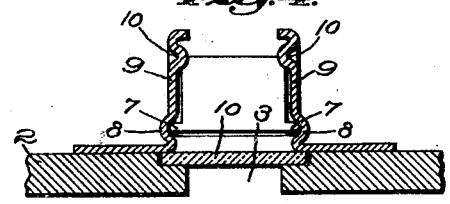
Inventor:
Clarence E. Wilson
by Emery, Booth, Janney & Varney
Attys

UNITED STATES PATENT OFFICE

CLARENCE E. WILSON, OF CONCORD, MASSACHUSETTS, ASSIGNOR TO NATIONAL COMPANY, INC., OF MALDEN, MASSACHUSETTS, A CORPORATION OF MASSACHUSETTS

GAUGE-GLASS ILLUMINATOR

Application filed March 1, 1929. Serial No. 343,682.

My invention aims to provide improvements in water column illuminators.

In the drawings, which illustrate a preferred embodiment of the invention:—

Figure 1 is a side elevation showing a conventional water column gauge with my improved illuminator mounted adjacent thereto and showing a portion broken away to reveal some of the angularly arranged plates at the opening in the illuminator;

Fig. 2 is a part elevation and part sectional view of the water column illuminator, as viewed from the side which faces the gauge glass;

Fig. 3 is a fragmentary section showing the angularly arranged plates moved into closed position; and Fig. 4 is an enlarged section taken on the line 4—4 of Fig. 2, showing the construction of the mounting means for the angularly arranged plates.

Referring now to the embodiment of my invention illustrated by the drawings, I have shown a liquid column illuminator device adapted to be mounted in any suitable manner adjacent to a gauge glass 1 of a boiler or the like and adapted to project rays of light toward the gauge glass at an angle, thereby to indicate the level of the water (or other fluid) in the gauge glass, so that it may be observed from a distance.

The broad idea of directing rays of light at the meniscus A, at the top of the column of water or other fluid, from an angle so that the rays of light will strike the under side of the meniscus and clearly indicate the location of the same is well-known in the art, as disclosed in the United States patent to Gothard Sargl No. 1,273,413, issued July 23, 1918. Therefore, my invention is directed to an improved device for indicating clearly the location of the meniscus by means of illumination. My device is so constructed that the meniscus in a gauge glass 1 will be clearly visible from a distance when it is located at any level of the gauge glass which is exposed between the glass-supporting fittings 1ª, shown in Figure 1.

My improved illuminator device comprises a housing 2 having a long, narrow opening 3 (Fig. 2) at one side in front of which I have arranged a number of superposed, inclined plates 4. Within the housing 2, I have provided a relatively long, narrow reflecting mirror 5 and between the mirror and the opening 3 an electric lamp 6. This lamp 6 is preferably located at the lower end of the housing.

The mirror 5 is arranged within the casing and has one end curved around the lamp 6 at the lower side thereof. The mirror extends from this curved portion along the back of the casing toward the top and is curved toward the front. This mirror is arranged and formed with the idea of reflecting light from the lamp toward the opening 3 at an angle which will pass upwardly between the plates 4, and to distribute rays of equal intensity throughout the entire length of the opening 3.

In order to secure proper illumination of the gauge glass 1 to secure the best results for indicating the level of the water, or other fluid, therein, it is advisable to prevent passage of horizontal and other rays of light from the housing to the gauge glass, which will not strike the meniscus from an angle below it. Any suitable means may be employed to prevent the passage of non-useful rays of light, but I prefer to illustrate and describe a preferred form of means which, in this instance, is the superposed, inclined plates 4. These plates 4 are relatively closely arranged so that the outer edge of one plate overlaps a portion of the next plate above, as clearly shown in Fig. 1. These plates 4 are preferably a dull black and merely act as guides for the rays of light projected between them at the proper (or nearly proper) angle from either the reflector 5 or the lamp 6. On the other hand, the plates 4 prevent passage of light rays from the lamp 6 or the reflector 5 at a horizontal (or nearly horizontal) plane.

The plates 4 are pressed from sheet metal and have projections 7 (Fig. 4) which extend into recesses 8 provided in the plate-supporting angular pieces 9 secured to the housing 2 adjacent to the opening 3. The projections 7 provide pivots about which the plates may swing. Normally the plates are spaced apart and rest against projections 10 formed along the inner faces of the angular pieces 9, as clearly indicated in Fig. 1. The supporting angular pieces 9 are made of sheet metal and the recesses 8 and projections 10 are pressed out by suitable dies.

In the front face of the housing 2, adjacent to the opening 3, I have grooved the material (Figs. 2 and 4) and placed strips of glass 10ª, which close the opening 3 and prevent passage of dust, dirt and foreign matter which would collect on the mirror 5 and lamp 6 and effect the efficiency of illumination. The glass 10ª is cut into several lengths, instead of being provided in a single piece, thereby to provide for expansion and contraction of the glass by heat from the lamp 6.

The housing 2 is provided, at opposite sides of its lower end, with openings 11 through which the lamp 6 may be inserted, while the lamp-supporting means 12 may be secured in place to cover an opening 11. The other opening is closed by a cover plate 13, as shown in Fig. 2. In some instances, the projecting supporting means 12 would interfere with the proper mounting of the illuminator device if it were located at one side, whereas if it could be changed to the opposite side this could be overcome.

If a gauge glass should explode (as they frequently do) the concussion would immediately force the plates 4 to positions shown in Fig. 3, thereby closing the opening 3 to the passage of broken glass. The automatic closing of the plates 4 will also prevent the breakage of the glass 10ª located between the plates and the interior of the housing 2.

While I have illustrated and described a preferred embodiment of my invention, I do not wish to be limited to the details of structure disclosed and, therefore, reference is made to the following claims which more clearly define the scope of my invention.

Claims.

1. A liquid column illuminator comprising a housing having an opening in one side facing a gauge glass containing the column of liquid, a source of light located within the housing adjacent to one end thereof, a parabolic reflector within and extending substantially the entire length of the housing, said reflector being shaped to receive rays of light from said source of light and to reflect them at an angle toward and through said opening in the housing, thereby to strike the meniscus at the top of the column of liquid clearly to indicate the location of the meniscus with relation to the gauge glass.

2. A liquid column illuminator comprising a housing having an opening in one side facing a gauge glass containing the column of liquid, a source of light located within the housing, a reflector assembled within and extending substantially the entire length of the housing, said reflector being shaped to receive rays of light from said source of light and to reflect them at an angle toward and through said opening in the housing, thereby to strike the meniscus at the top of the column of liquid clearly to indicate the location of the meniscus with relation to the gauge glass, and means operable to prevent improperly directed rays of light from falling upon the gauge glass or liquid column.

3. A liquid column illuminator comprising a housing having an opening in one side thereof, a lamp mounted within said housing to provide a source of light, a reflector mounted within said housing and adapted to reflect rays of light from said light toward the opening in said housing, and a number of pivotally mounted, inclined members mounted transverse to said opening, thereby to provide means which prevent passage of the rays of light from said illuminator except those directed at an upward angle with relation to a column of liquid, said plates being adapted to swing into overlapping relation to close the opening in the casing.

4. A water column illuminator comprising a relatively tall housing adapted to be mounted behind a water gauge, an opening in said housing facing the gauge, a source of light mounted within the housing at one end, a reflector mounted within said housing and facing said opening, said reflector extending from the bottom to the top of the housing and curving toward and nearer to the opening as it extends from the source of light, thereby to reflect light toward said opening at an angle.

5. A water column illuminator comprising a relatively tall housing adapted to be mounted behind a water gauge, an opening in said housing facing the gauge, a source of light mounted within the housing at one end, a reflector mounted within said housing and facing said opening, said reflector extending from the bottom to the top of the housing and curving toward and nearer to the opening as it extends from the source of light, thereby to reflect light toward said opening at an angle, and a number of angularly arranged partition members transversing said opening, as and for the purposes described.

6. In a liquid column illuminator of the class described, a housing having an opening through which light is projected to illuminate a column of liquid and a number of pivotally mounted, inclined plates adapted to swing into overlapping contact to close said opening in case of an explosion of a gauge glass containing a column of liquid.

7. A liquid column illuminator comprising a housing having an opening in one side facing a gauge glass containing the column of liquid, a source of light located within the housing adjacent to one end, a reflector located within and extending substantially the entire length of the housing, said reflector being adapted to receive rays of light from said source of light and being shaped to reflect them at an angle toward and through said opening in the housing, thereby to strike the meniscus at the top of the column of liquid clearly to indicate the location of the meniscus with relation to the gauge glass, a mounting for the source of light, and means permitting mounting of the source of light from either of two sides of the housing.

8. A liquid column illuminator comprising a housing having an opening in one side thereof, a lamp mounted within said housing to provide a source of light, a reflector mounted within said housing and adapted to reflect rays of light from said light toward the opening in said housing and a number of pivotally mounted, inclined members mounted transverse to said opening, thereby to provide means which prevent passage of the rays of light from said illuminator except those directed at an upward angle with relation to a column of liquid, said pivotally mounted members having projections 7 fitting into recesses 8 formed in members 9 secured to the open face of the housing and the free ends of said pivotally mounted members normally resting against spacing projections 10 also formed on the members 9.

9. A water column illuminator comprising a relatively tall housing adapted to be mounted behind a water gauge, an opening in said housing facing the gauge, a source of light mounted within the housing at one end, a reflector mounted within said housing and facing said opening, said reflector extending from the bottom to the top of the housing and curving toward and nearer to the opening as it extends from the source of light, thereby to reflect light toward said opening at an angle, said source of light being mounted adjacent to the lower end of the housing and a series of pivotally mounted plates adapted to swing into overlapping contact to close the opening in said housing in case of an explosion in a gauge glass, thereby to protect the source of light and the said reflector.

10. In a liquid column illuminator of the class described, a housing having an opening through which light is projected to illuminate a column of liquid, a source of light mounted inside of said housing, a reflector located inside of said housing and shaped to project rays of light toward the opening in the housing at an angle, and a number of pivoted plates mounted on the housing adjacent to the opening and adapted to swing into overlapping contact to close the said opening in case of an explosion of a gauge glass containing the column of liquid, thereby to protect the source of light and the said reflector.

11. In a liquid column illuminator of the class described, a housing having an opening through which light is projected to illuminate a column of liquid, a source of light mounted inside of said housing, a reflector located inside of said housing and shaped to project rays of light toward the opening in the housing at an angle, a number of pivoted plates mounted on the housing adjacent to the opening and adapted to swing into overlapping contact to close the said opening in case of an explosion of a gauge glass containing the column of liquid, thereby to protect the source of light and the said reflector, and transparent means normally closing the opening in the said housing against passage of dust, dirt and moisture.

In testimony whereof, I have signed my name to this specification.

CLARENCE E. WILSON.